(12) United States Patent
Pi

(10) Patent No.: US 8,695,175 B2
(45) Date of Patent: Apr. 15, 2014

(54) FAST LOCK FIXING CLIP FOR VEHICLE SEATBELT

(76) Inventor: Ching-Tien Pi, New Taipei (TW)

( * ) Notice: Subject to any disclaimer, the term of this patent is extended or adjusted under 35 U.S.C. 154(b) by 152 days.

(21) Appl. No.: 13/289,336

(22) Filed: Nov. 4, 2011

(65) Prior Publication Data

US 2012/0110798 A1    May 10, 2012

(30) Foreign Application Priority Data

Nov. 9, 2010    (TW) .............................. 99221671 U

(51) Int. Cl.
    *B60R 22/34*    (2006.01)
(52) U.S. Cl.
    USPC ................... 24/170; 24/543; 24/349; 24/200; 24/343
(58) Field of Classification Search
    USPC ........... 24/458, 487, 545, 327, 329, 335, 343, 24/349, 30.5 R, 543, 170, 200; D28/43
    See application file for complete search history.

(56) References Cited

U.S. PATENT DOCUMENTS

| | | | | |
|---|---|---|---|---|
| 3,040,749 A | * | 6/1962 | Payton | 606/120 |
| 5,123,146 A | * | 6/1992 | Olson | 24/30.5 R |
| 5,535,969 A | * | 7/1996 | Duffy, Jr. | 248/68.1 |
| 5,598,608 A | * | 2/1997 | Naslund | 24/30.5 R |
| 5,960,522 A | * | 10/1999 | Boe | 24/543 |
| 7,004,547 B1 | * | 2/2006 | Cheng | 297/483 |
| 7,428,771 B2 | * | 9/2008 | Fujii et al. | 24/543 |
| 7,740,271 B2 | * | 6/2010 | Nezaki et al. | 280/733 |

* cited by examiner

*Primary Examiner* — Robert J Sandy
*Assistant Examiner* — Rowland D Do
(74) *Attorney, Agent, or Firm* — Muncy, Geissler, Olds, & Lowe, P.C.

(57) ABSTRACT

A fast lock fixing clip for vehicle seatbelt includes: a front clip plate including a front clip plate main body having a first end, a second end and a turning auxiliary plate; a rear clip plate including a rear clip plate main body having a first end, a second end and a seatbelt pressing plate; a pivotal device for rotatably connecting the second ends of the front and rear clip plate main bodies; and a latch device for latching/unlatching the first ends of the front and rear clip plate main bodies with each other. When mounted on the seatbelt, the fast lock fixing clip will automatically turns upward to fold the seatbelt. In case of collision, when the folded seatbelt is abruptly straightened, the end of the seatbelt is instantaneously strongly accelerated to more sensitively and quickly activate the automatic locking device of the seatbelt to lock the seatbelt.

4 Claims, 4 Drawing Sheets

FAST LOCK FIXING CLIP FOR VEHICLE SEATBELT

BACKGROUND OF THE INVENTION

1. Field of the Invention

The present invention relates generally to a fast lock fixing clip, and more particularly to a fast lock fixing clip for vehicle seatbelt. The fast lock fixing clip is mountable on the vehicle seatbelt by means of clipping for more sensitively and quickly activating the automatic locking device of the seatbelt to lock the seatbelt.

2. Description of the Related Art

The existent vehicle seatbelt generally has automatically winding function. After used, the seatbelt can be automatically wound into the seatbelt cabinet. However, in use, such automatically winding function often results in that a passenger's chest is continuously compressed to have painful and chest distress feeling. Such feeling is intolerable. Therefore, some passengers are often reluctant to fasten the seatbelt. Under such circumstance, in case of collision of the vehicle, the passengers will get injured. This very seriously affects safety in driving.

To overcome the above shortcoming, currently, there is a kind of fixing clip in the market, which can be directly mounted on the seatbelt by means of clipping. By means of the fixing clip, the seatbelt can be pulled out by a certain length and spaced from a user's chest by a certain distance to achieve comfortableness and release the user from the strangling feeling in fastening the seatbelt. However, such fixing clip will elongate the locking buffer distance of the seatbelt and defer the locking effect for the seatbelt. This is extremely dangerous.

SUMMARY OF THE INVENTION

A primary object of the present invention is to provide a fast lock fixing clip for vehicle seatbelt. The fast lock fixing clip is mountable on the vehicle seatbelt by means of clipping. The fast lock fixing clip can be moved upward under the automatically winding force of the seatbelt. When abutting against the seatbelt ring, a force couple is applied to the fast lock fixing clip to make the fast lock fixing clip turn upward to fold the seatbelt into a ready state for instantaneous acceleration.

A further object of the present invention is to provide the above fast lock fixing clip for vehicle seatbelt. The fast lock fixing clip can automatically turn upward to fold the seatbelt. In case of collision, when the folded seatbelt is abruptly straightened, the end of the seatbelt is instantaneously strongly accelerated and pulled to sensitively and quickly activate the automatic locking device of the seatbelt to lock the seatbelt.

To achieve the above and other objects, the fast lock fixing clip for vehicle seatbelt of the present invention includes: a front clip plate including a front clip plate main body having a first end, a second end and a turning auxiliary plate; a rear clip plate including a rear clip plate main body having a first end, a second end and a seatbelt pressing plate; a pivotal device for rotatably connecting the second ends of the front and rear clip plate main bodies; and a latch device for latching/unlatching the first ends of the front and rear clip plate main bodies with each other.

BRIEF DESCRIPTION OF THE DRAWINGS

The structure and the technical means adopted by the present invention to achieve the above and other objects can be best understood by referring to the following detailed description of the preferred embodiment and the accompanying drawings, wherein.

DETAILED DESCRIPTION OF THE PREFERRED EMBODIMENT

Figure 1:
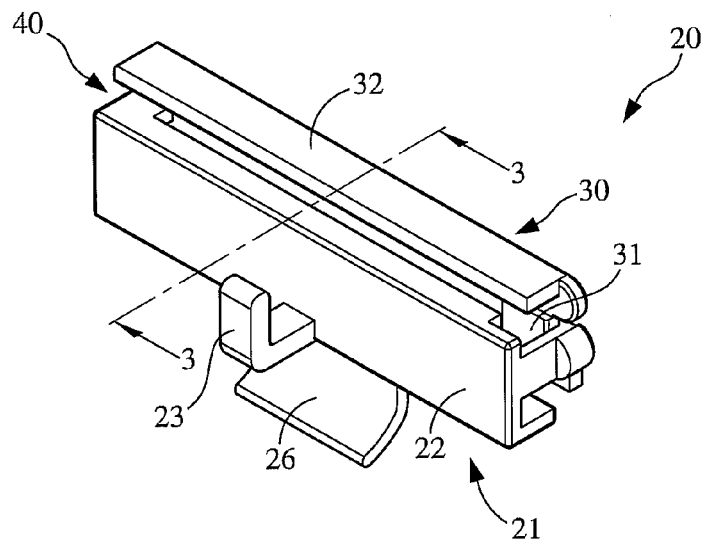
FIG. 1 is a perspective assembled view of the fast lock fixing clip for vehicle seatbelt of the present invention.
Figure 2:
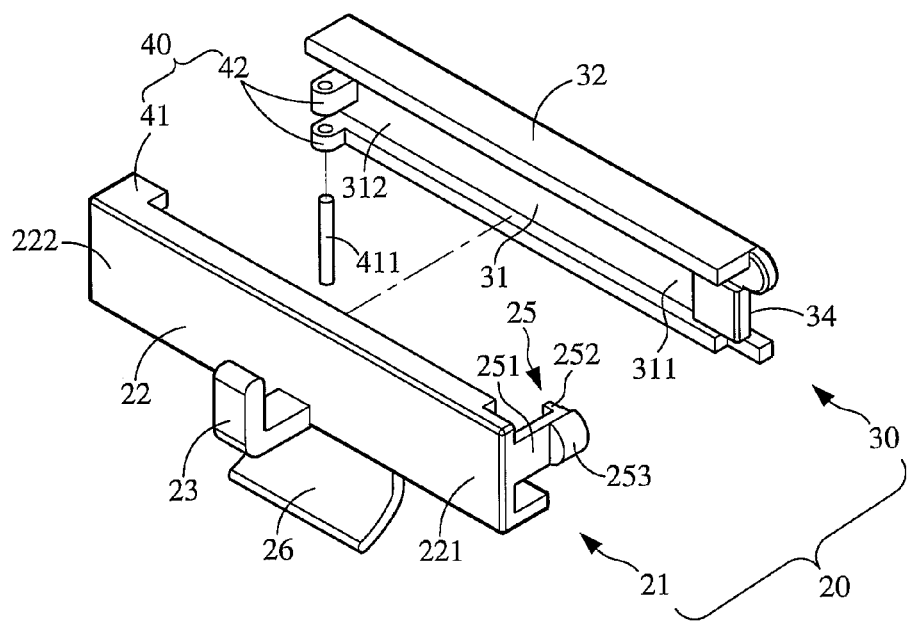
FIG. 2 is a front perspective exploded view of the fast lock fixing clip for vehicle seatbelt of the present invention.
Figure 3:
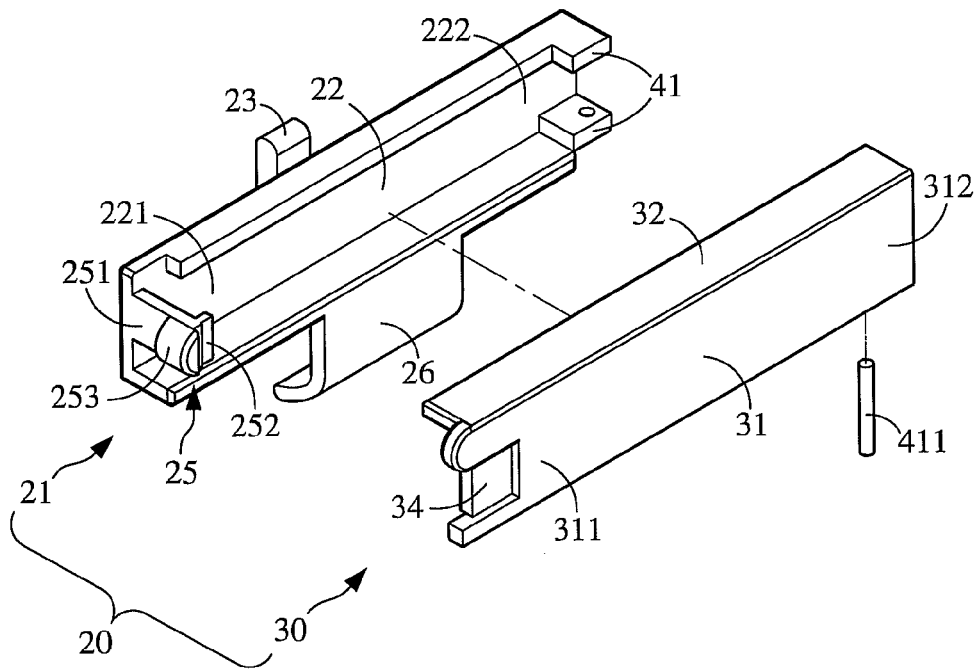
FIG. 3 is a rear perspective exploded view of the fast lock fixing clip for vehicle seatbelt of the present invention.
Figure 4:
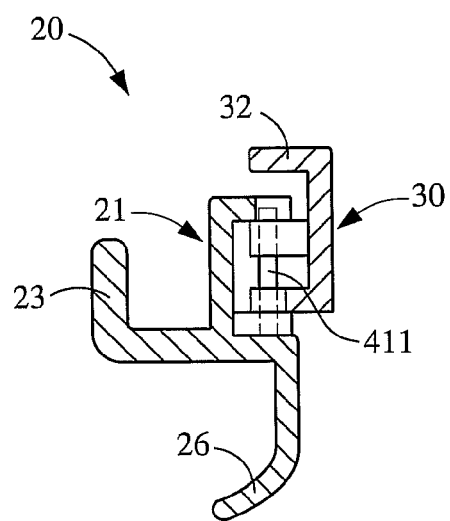
FIG. 4 is a sectional view taken along line 4-4 of FIG. 1.

Please refer to FIGS. 1 to 4. The fast lock fixing clip 20 for vehicle seatbelt of the present invention includes a front clip plate 21, a rear clip plate 30 and pivotal device 40 for rotatably connecting the front and rear clip plates 21, 30 with each other. The front clip plate 21 includes a front clip plate main body 22 having a first end 221 and a second end 222. A hanging hook 23 forward extends from a front face of the front clip plate main body 22. A turning auxiliary plate 26 downward extends from a bottom end of the front clip plate main body 22. The rear clip plate 30 includes a rear clip plate main body 31 having a first end 311, a second end 312 and a seatbelt pressing plate 32 forward extending from a top end of the rear clip plate main body 31. The pivotal device 40 includes a forked arm 41 disposed at the second end 222 of the front clip plate main body 22 and a spacer protrusion block 42 disposed at the second end 312 of the rear clip plate main body 31 and mounted in the forked arm 41. A pivot pin 411 is inserted through the forked arm 41 and the spacer protrusion block 42 to rotatably connect the front and rear clip plate main bodies 22, 31 with each other. Accordingly, The front and rear clip plate main bodies 22, 31 of the fast lock fixing clip 20 can be pivotally opened or closed around the pivot pin 411.

The first end 221 of the front clip plate 21 and the first end 311 of the rear clip plate 30 can be latched with each other by means of a latch device. The latch device includes a latch member 25 and a latch recess 34. The latch member 25 rearward extends from the first end 221 of the front clip plate main body 22. The latch member 25 has a connection end section 251, a latch protrusion section 252 and a shift section 253. The latch recess 34 is formed on a rear face of the first end 311 of the rear clip plate main body 31. The latch protrusion section 252 of the front clip plate main body 21 can be latched in the latch recess 34 or unlatched from the latch recess 34.

Figure 5:
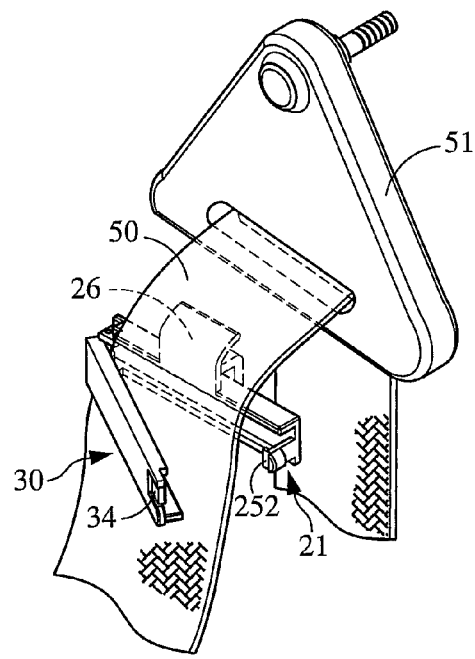
FIG. 5A is a perspective view showing that the fast lock fixing clip of the present invention is to be mounted on the seatbelt.
FIG. 5B is a sectional view showing that the fast lock fixing clip of the present invention is mounted on the seatbelt.
FIG. 5C is a sectional view showing that the fast lock fixing clip of the present invention is mounted on the seatbelt and moved and turned upward under the automatically winding force of the seatbelt.
Figure 5:
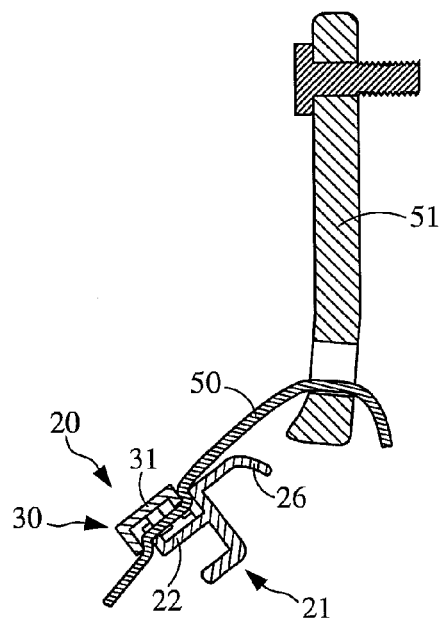
Figure 5:
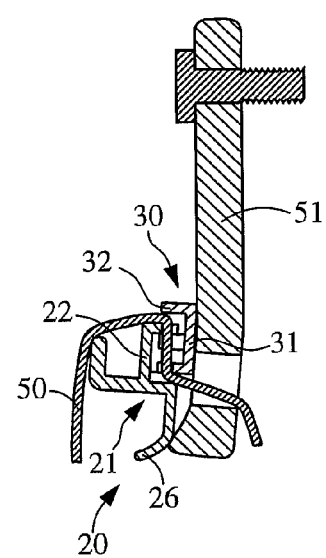

FIGS. 5A to 5C show the manner in which the fast lock fixing clip 20 of the present invention is mounted on the vehicle seatbelt 50. The fast lock fixing clip 20 of the present invention is applicable to the seatbelt of any kind of vehicle. First, after the seatbelt 50 is fastened, the seatbelt 50 is pulled downward by such a length as to allow a user's body to slightly move. Then, the front and rear clip plates 21, 30 clip the seatbelt 50 in a predetermined position with the front clip plate 21 positioned behind the seatbelt 50 and the rear clip plate 30 positioned in front of the seatbelt 50 as shown in FIG. 5A.

Thereafter, a pressing force is applied to the front and rear clip plates 21, 30 to latch the latch protrusion section 252 into the latch recess 34 and close the fast lock fixing clip 20. Under such circumstance, the fast lock fixing clip 20 clips the seatbelt 50 as shown in FIG. 5B.

Figure 6:
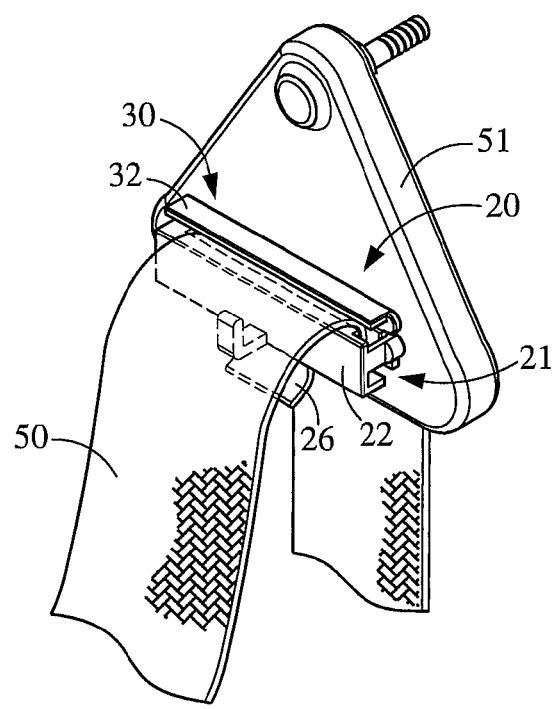
FIG. 6 is a perspective view according to FIG. 5C.

Then the seatbelt 50 is released from the pulling force. At this time, under the automatically winding force, the fast lock fixing clip 20 is moved upward with the seatbelt 50 until the turning auxiliary plate 26 of the front clip plate 21 abuts against the seatbelt ring 51. At this time, a force couple is applied to the fast lock fixing clip 20, making the fast lock fixing clip 20 turn upward to fold the seatbelt into a ready state for instantaneous acceleration as shown in FIGS. 5C and 6. The upturned fast lock fixing clip 20 will make the seatbelt 50 first extend upward and then suspend from the fast lock fixing clip 20. Accordingly, the length of the pulled out seatbelt is increased. By means of the seatbelt pressing plate 32, after extending out of the fast lock fixing clip 20, the seatbelt immediately turns downward to suspend from the fast lock fixing clip 20. This can prevent the seatbelt from being too excessively loosened in front of the user's chest so that the instantaneous acceleration will not be deferred. In case of collision in driving, when the user's body rushes forward and the folded seatbelt 50 is abruptly straightened, the end of the seatbelt 50 is instantaneously strongly accelerated to activate the automatic locking device of the seatbelt to lock the seatbelt. After achieving the locking effect, the seatbelt 50 will automatically restore to its original state to gently attach to the user's body. In the case that the user's body naturally tilts forward, the seatbelt 50 will not be locked so that the user's body can freely move without being obstructed.

Figure 7:
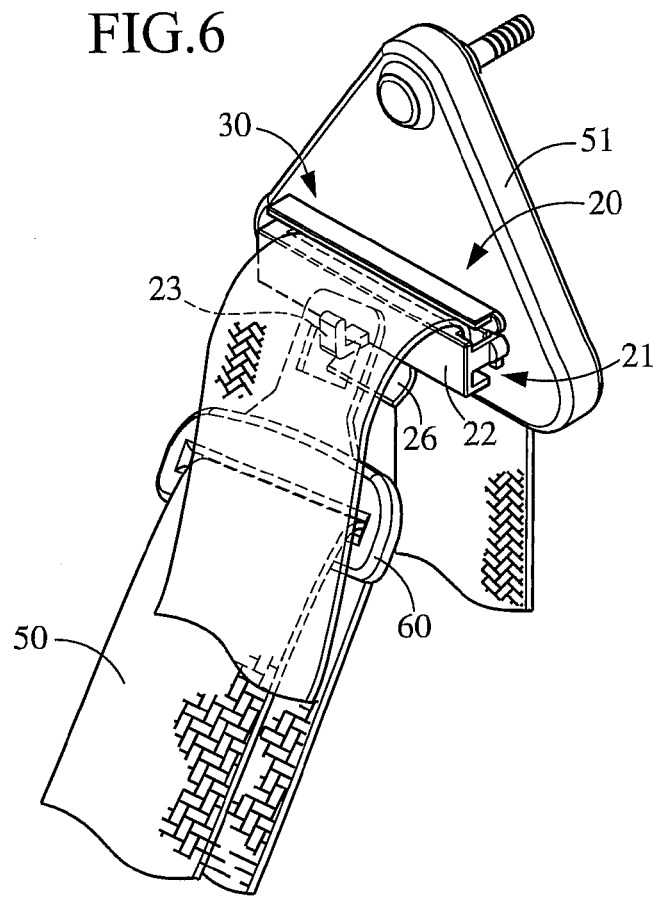
FIG. 7 is a perspective view showing that the seatbelt buckle is hung on the hanging hook of the fast lock fixing clip of the present invention.

As shown in FIG. 7, after a user steps out the vehicle, the seatbelt buckle 60 of the seatbelt can be hung on the hanging hook 23 of the front clip plate main body 22. This can prevent the seatbelt 50 from being randomly placed in a tangle and protect the seatbelt buckle 60 from being clamped and damaged by the vehicle door.

The above embodiment is only used to illustrate the present invention, not intended to limit the scope thereof. It is understood that many changes or modifications of the above embodiment can be made by those who are skilled in this field without departing from the spirit of the present invention. The scope of the present invention is limited only by the appended claims.

What is claimed is:

1. A fast lock fixing clip for a vehicle seatbelt, which can be pulled out from a seatbelt ring to plug a seatbelt buckle into a socket for ensuring safety in driving, the fast lock fixing clip comprising: a front clip plate including a front clip plate main body having a first end, a second end, a bottom end and a turning auxiliary plate downwardly extends from the bottom end of the front clip plate main body; a rear clip plate including a rear clip plate main body having a first end, a second end and a seatbelt pressing plate; a pivotal device disposed at the second ends of the front and rear clip plate main bodies for rotatably connecting the front and rear clip plate main bodies; and a latch device disposed at the first ends of the front and rear clip plate main bodies, whereby the first ends of the front and rear clip plate main bodies can be latched with each other or unlatched from each other, such that when the front and rear clip plate main bodies are latched with each other, the front clip plate being positioned behind the seatbelt and the rear clip plate being positioned in front of the seatbelt, under an automatically winding force from the seatbelt, then the fast lock fixing clip being moved upwardly with the seatbelt until the turning auxiliary plate abuts against the seatbelt ring and resulting in a coupling force being applied to the fast lock fixing clip to make the fast lock fixing clip turn upwardly to fold the seatbelt into a ready state for instantaneous acceleration of the seatbelt.

2. The fast lock fixing clip as claimed in claim 1, wherein a hanging hook forward extends from a front face of the front clip plate main body, and whereby the seatbelt buckle can be hung on the hanging hook.

3. The fast lock fixing clip as claimed in claim 1, wherein the latch device includes a latch member and a latch recess, the latch member rearward extending from the first end of the front clip plate main body, the latch member having a connection end section, a latch protrusion section and a shift section, the latch recess being formed on the first end of the rear clip plate main body, and whereby the latch protrusion section of the front clip plate main body can be latched in the latch recess and a force can be applied to the shift section to unlatch the latch protrusion section from the latch recess so as to separate the first ends of the front and rear clip plate main bodies.

4. The fast lock fixing clip as claimed in claim 1, wherein a seatbelt pressing plate forward extends from a top end of the rear clip plate main body, the seatbelt pressing plate being able to make the seatbelt directly turn downward to suspend from the fast lock fixing clip when the seatbelt extends out from the fast lock fixing clip, and whereby the seatbelt is prevented from being over-pulled by a too long length so that the locking time for the seatbelt will not be prolonged.

* * * * *